United States Patent [19]
King

[11] Patent Number: 5,413,063
[45] Date of Patent: May 9, 1995

[54] RAIL FITTING FOR MARINE APPLICATIONS

[76] Inventor: William E. King, 6758 S. Heggenes Rd., Clinton, Wash. 98236

[21] Appl. No.: 183,760
[22] Filed: Jan. 21, 1994
[51] Int. Cl.$^6$ .............................................. B63B 17/00
[52] U.S. Cl. .............................. 114/221 R; 248/231.5; 114/361; 114/364
[58] Field of Search ................. 114/221 R, 361, 364; 248/231.5, 316.5; 182/113; 24/489

[56] References Cited

U.S. PATENT DOCUMENTS

| | | |
|---|---|---|
| 4,799,444 | 1/1989 | Lisowski ......................... 114/221 R |
| 4,953,820 | 9/1990 | Yoder .............................. 248/231.5 |

FOREIGN PATENT DOCUMENTS 2127887  4/1984  United Kingdom ................ 182/113

*Primary Examiner*—Sherman Basinger
*Attorney, Agent, or Firm*—Harry M. Cross, Jr.

[57] ABSTRACT

A rail fitting for marine application comprises first and second rail fitting parts designed to slide together on opposite sides of a rail and thereby interlock. Each rail fitting part is provided with an arcuate concavity designed to fit around a rail, a first end on one side of the concavity designed to interlock with a first end of the other rail fitting part, and a second end on an opposite side of the concavity designed to be fastened to a second end of the other rail fitting part by a fastener. The first end of the first rail fitting part is provided with an arcuate cavity having a degree of wrap of at least 180°. The first end of the second rail fitting part is provided with a hinge arm having an arcuate end formed to fit and rotate within the arcuate cavity in the first end of the first rail fitting part. The concavity provided in each rail fitting part provides a combined arcuate concavity through which a railing may extend.

7 Claims, 1 Drawing Sheet

U.S. Patent        May 9, 1995        5,413,063
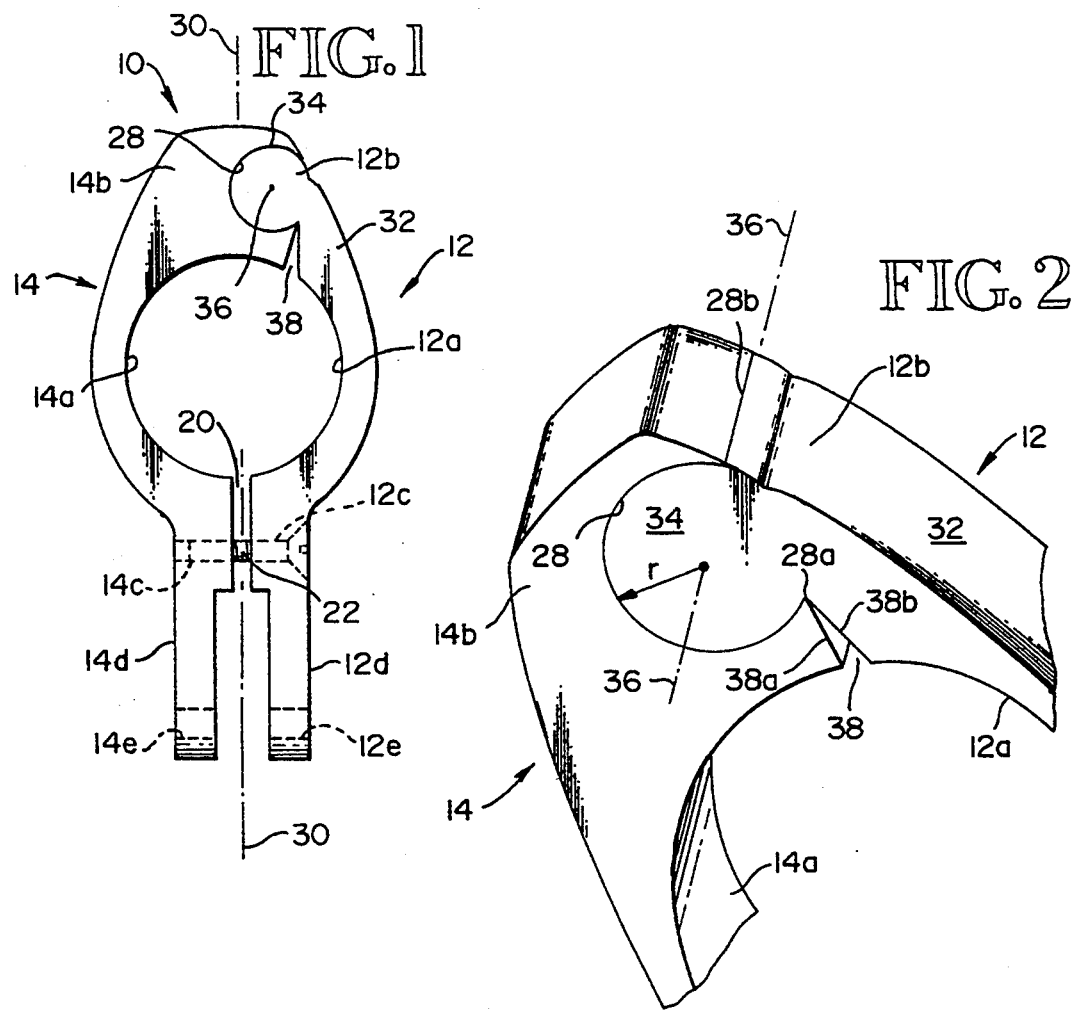
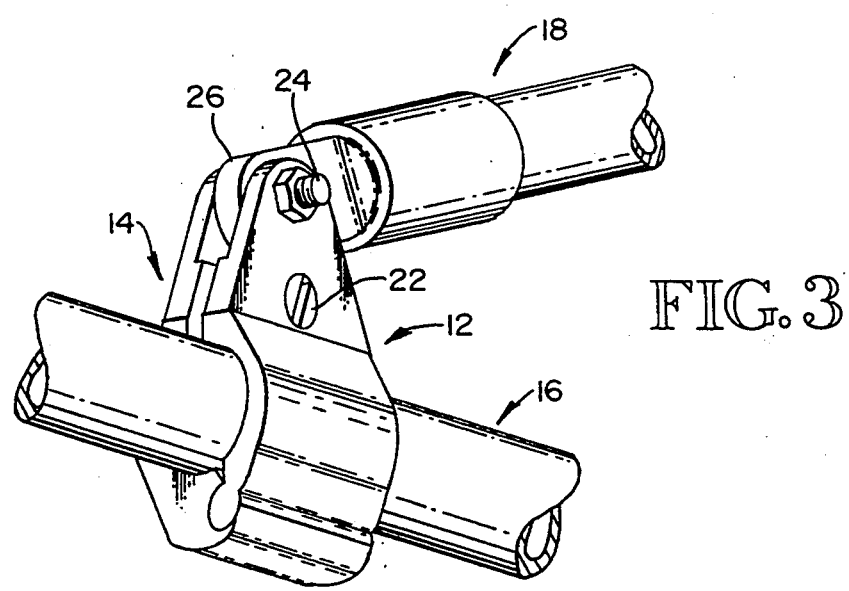

RAIL FITTING FOR MARINE APPLICATIONS

FIELD OF THE INVENTION

This invention relates to rail fittings designed to clamp around rails of the type used in marine applications, particularly as used on pleasure boats.

BACKGROUND OF THE INVENTION

Rail fittings have been employed in the marine industry, particularly as associated with pleasure boating, to mount various equipment and structures to rails. Since typical rails are more or less continuous lengths of tubing, suitable rail fittings must be constructed so as to be attachable to and detachable from a rail without having to dismantle the rail. Moreover, suitable rail fittings should be constructed so that their position along a rail may be adjusted without having to dismantle the fitting and without having to remove whatever is attached to the fitting. Rail fittings of the category contemplated by the present invention are useful in installing so-called "bimini" tops, stringers for fender racks, and other similar uses where a "tube slide" or "rail mount hinge" would be employable, and are useful in installing CB, radar, fishing and other apparatus to rails.

SUMMARY OF THE INVENTION

The rail fitting of the present invention is composed of two parts that are designed to slide together on opposite sides of a rail, and thereby interlocked. The rail fitting easily fastens about a rail with a single screw or bolt to the exact location desired. Each rail fitting part is provided with an arcuate concavity designed to fit snugly around a railing, a first end on one side of the concavity designed to interlock with a first end of the other part, and a second end on an opposite side of the concavity designed to be fastened to a second end of the other part. The second ends of the two parts also provide, in their combination when mounted to a railing, means for connecting to some other element or apparatus.

A rail fitting, according to the invention, comprises first and second rail fitting parts designed to slide together on opposite sides of a rail and thereby interlock, and fastening means for fastening the two rail fitting parts together around a rail. Each rail fitting part is provided with an arcuate concavity designed to fit around a rail, a first end on one side of the concavity designed to interlock with a first end of the other rail fitting part, and a second end on an opposite side of the concavity designed to be fastened to a second end of the other rail fitting part by said fastening means. The first end of the first rail fitting part is provided with an arcuate cavity having a degree of wrap of at least 180°. The first end of the second rail fitting part is provided with a hinge arm having an arcuate end formed to fit and rotate within the arcuate cavity in the first end of the first rail fitting part. The hinge arm is so constructed and arranged with respect to the arcuate cavity that the arcuate end of the hinge arm may be longitudinally inserted into the arcuate cavity whereby the first and second rail fitting parts are interlocked. The concavity provided in each rail fitting part provides a combined arcuate concavity of circular configuration when the first and second rail fitting parts are interlocked. A V-shaped gap is provided that opens into the combined arcuate concavity, the V-shaped gap being so located and defined by adjacent edges of the interlocked first ends of the first and second rail fitting parts whereby the first and second rail fitting parts may be rotated in snug engagement with a railing that extends through the combined arcuate concavity.

BRIEF DESCRIPTION OF THE DRAWINGS

FIG. 1 is an end view of the rail fitting of this invention;

FIG. 2 is a perspective view of the FIG. 1 rail fitting; and

FIG. 3 is a perspective view of the FIG. 1 rail fitting as it would appear when mounted to a tubular railing and when another element or apparatus is attached to the fitting.

DETAILED DESCRIPTION OF THE INVENTION

The rail fitting 10 of this invention comprises two parts, 12, 14, which may be interlocked together about a railing 16 so that some other element 18 may be attached thereto and secured with respect to the railing 16. Each part is provided with an arcuate concavity 12a, 14a, shown in the drawings to be semicircular, for snugly fitting around the railing 16. The two parts 12, 14 are so constructed at 12b and 14b, respectively, as to be detachably interlockable about the railing 16. When the two parts are interlocked and positioned around a cylindrical railing, the resulting combined concavity is substantially circular, there being a finite gap 20 provided between the two assembled parts 12, 14 to insure that the two parts can be snugly secured to the railing 16. This snug attachment is achieved by fastening means 22 that bind the two parts 12, 14 together on the side of the railing that is opposite to the interlocking portions 12b, 14b. Consequently, the resultant substantially semicircular combined concavity 12a, 14a is located between the interlocking portions 12b, 14b and the fastening means 22 so that the railing 16 can be clamped therebetween. The fastening means 22 comprises a threaded screw that extends through an unthreaded bore, eg 12c, in one part and is secured in a threaded bore, eg 14c, in the other part. The fastening means 22, provided in the form of a threaded screw, includes a countersink head that bears against a countersunk inlet to the unthreaded bore so that threading the screw into the threaded bore will draw the two parts together about the railing 16.

The portion, 12d, 14d, of each fitting part 12, 14 that is adjacent to the fastening means 22 is so constructed as to provide means for attachment to another element or apparatus 18. In the embodiment shown in the drawings, portions 12d, 14d comprises two sides or arms of a clevis and their outer extremities are provided with clevis pin bores 12e, 14e. A clevis pin means 24 in the form of a clevis bolt may be inserted through the clevis pin bores to secure an attachment bar 26 of apparatus 18 into the clevis.

The portions, 12b, 14b, of the fitting parts 12, 14 are constructed to be both hingeable and interlockable. In the embodiment shown in the drawings, portion 12b is insertable in portion 14b. Insertion is accomplished by transversely sliding the two parts together so as to cause portion 12b to be slid into portion 14b whereby the first and second rail fitting parts are interlocked. Portion 14b is constructed to provide an off-center arcuate concavity 28 (off-center with respect to the longitudinal centerline 30 of fitting 10) that is preferably semicircular with a degree of wrap of at least 180°. Portion 12b is constructed to provide a hinge arm 32 with an arcuate outer end 34 that is preferably semicircular with an outer diameter closely approximating the inner diameter of concavity 28. End 34 of hinge arm 32 is confined within concavity 28 (when the two parts 12, 14 are interlocked as shown in the drawings) by reason of concavity 28 having a degree of wrap greater that 180°.

End 34 is constructed so that its circularity continues beyond the concavity 28 when the two parts 12, 14 are interlocked. Consequently, hinge arm 32 may be pivoted relative to portion 14b by rotating end 34 in concavity 28 about their common axis of rotation 36. To enable this hingeability, the degree of wrap of end 34 must be a few degrees greater than the degree of wrap of the concavity 28. The hingeability must be great enough to allow the two parts 12, 14 to be rotated about the axis 36 into snug contact with the railing 16. To facilitate this required degree of rotation, the adjacent inner edges of portions 12b, 14b are formed to provide a V-shaped gap 38. Gap 38 extends from the inner edge 28a of concavity 28 toward the combined concavity 12a, 14a and has its apex at edge 28a. Gap 38 is sufficiently wide at its intersection with the combined concavity 12a, 14a that the fitting parts 12, 14 may be snugly tightened against railing 16 with the side walls 38a, 38b of gap 38 coming together.

The hingeability of parts 12, 14 is also preferably great enough to allow parts 12, 14 to be rotated about the axis 36 outward and away from contact with railing 16. This degree of hingeability that permits a few degrees of outward rotation, as opposed to inward clamping rotation, would enable the two parts 12, 14 to slide along the railing 16, even when interlocked, without danger of marring or scratching the exterior finish of railing 16. Since rail fitting 10 and railing 16 are often fabricated from stainless steel and polished to a high gloss, being able to swing the two parts 12, 14 even slightly away from one another so as to preserve the finish as fitting 10 is moved relative to railing 16 is important. In order to provide for this outward hingeability, the outer surface of hinge arm 32 must continue the circularity of end 34 beyond the outer edge 28b of concavity 28. In other words, the radius "r" of end 34 must be constant through an arc that extends beyond edge 28b a sufficient distance so that arm 32 can swing outward to the desired extent. The degree of wrap of concavity 28 is must be at least 225° and less than 270°. The degree of wrap of end 34 is preferably slightly more than that of concavity 28. The diameters of concavity 28 and end 34 are nominally the same so that a close fit is obtained when the two parts 12, 14 are interlocked. In the embodiment shown in the drawings, the combined concavity 12a, 14a forms an almost completely enclosed circle, excepting only the gaps 22 and 38.

While the preferred embodiment of the invention has been described herein, variations in the design may be made. The scope of the invention, therefore, is only to be limited by the claims appended hereto.

The embodiments of the invention in which an exclusive property is claimed are defined as follows:

In the claims:

1. A rail fitting which comprises first and second rail fitting parts designed to slide together on opposite sides of a rail and thereby interlock, and fastening means for fastening the two rail fitting parts together around a rail; each rail fitting part being provided with an arcuate concavity designed to fit around a rail, a first end on one side of the concavity designed to interlock with a first end of the other rail fitting part, and a second end on an opposite side of the concavity designed to be fastened to a second end of the other rail fitting part by said fastening means; the first end of said first rail fitting part being provided with an arcuate cavity having a degree of wrap of at least 180°; the first end of said second rail fitting part being provided with a hinge arm having an arcuate end formed to fit and rotate within the arcuate cavity in the first end of said first rail fitting part; said hinge arm being so constructed and arranged with respect to said arcuate cavity that the arcuate end of said hinge arm may be longitudinally inserted into said arcuate cavity whereby the first and second rail fitting parts are interlocked.

2. The rail fitting of claim 1 wherein the arcuate cavity in the first end of the first rail fitting part having a degree of wrap between about 225° and 270°; and wherein the degree of wrap of the end of the hinge arm of the second rail fitting part is slightly greater than the degree of wrap of said arcuate cavity whereby said first and second rail fitting parts may be rotated a few degrees inward and outward with respect to one another after they have been interlocked.

3. The rail fitting of claim 2 wherein the concavity provided in each rail fitting part provides a combined arcuate concavity of circular configuration when the first and second rail fitting parts are interlocked; and wherein a V-shaped gap is provided that opens into the combined arcuate concavity, said V-shaped gap being so located and defined by adjacent edges of the interlocked first ends of the first and second rail fitting parts whereby the first and second rail fitting parts may be rotated in snug engagement with a railing that extends through the combined arcuate concavity.

4. A rail fitting which comprises first and second rail fitting parts designed to slide together on opposite sides of a rail and thereby interlock, and fastening means for fastening the two rail fitting parts together around a rail; each rail fitting part being provided with a concavity designed to fit around a rail, a first end on one side of the concavity designed to interlock with a first end of the other rail fitting part in hinged connection, and a second end on an opposite side of the concavity designed to be fastened to a second end of the other rail fitting part by said fastening means; the first end of said first rail fitting part having a hinge receiving means providing a semicylindrical arcuate cavity having a degree of wrap of at least 180°, said arcuate cavity extending transversely through the first end of said first fitting part; the first end of said second rail fitting part having hinge arm means providing an arcuate end formed to fit and rotate within the arcuate cavity in the first end of said first rail fitting part, said arcuate end being semicylindrical and extending transversely across the first end of said second rail fitting part; said hinge arm means being so constructed and arranged with respect to said hinge receiving means that the arcuate end of said hinge arm means may be longitudinally inserted into said arcuate cavity whereby the first and second rail fitting parts are interlocked in said hinged connection.

5. The rail fitting of claim 4 wherein the arcuate cavity of said hinge receiving means has a degree of wrap between about 225° and 270°; and wherein the degree of wrap of the arcuate end of the hinge arm means is slightly greater than the degree of wrap of said arcuate cavity whereby said first and second rail fitting parts may be rotated a few degrees inward and outward with respect to one another after they have been interlocked.

6. The rail fitting of claim 5 wherein the concavity provided in each rail fitting part provides a combined arcuate concavity of circular configuration when the first and second rail fitting parts are interlocked; and wherein a V-shaped gap is provided in the first ends of the first and second rail fitting parts that opens into the combined arcuate concavity, said V-shaped gap being so located and defined by adjacent edges of the interlocked first ends of the first and second rail fitting parts with the apex of the V-shaped gap abutting the arcuate end of said hinge arm means whereby the first and second rail fitting parts may be rotated in snug engagement with a railing that extends through the combined arcuate concavity.

7. The rail fitting of claim 4 wherein the second ends of each rail fitting part are provided with attachment means located outwardly of said fastening means and so constructed and arranged that an object may be attached to said attachment means when said rail fitting parts are fastened to a rail whereby said rail fitting joins the object to the rail.

* * * * *